United States Patent

[11] 3,561,660

| [72] | Inventors | Edward A. Nicol<br>Farmington, Mich.;<br>Edward M. Johnson, Glenside, Pa. |
| --- | --- | --- |
| [21] | Appl. No. | 771,236 |
| [22] | Filed | Oct. 28, 1968 |
| [45] | Patented | Feb. 9, 1971 |
| [73] | Assignee | Burroughs Corporation<br>Detroit, Mich.<br>a corporation of Michigan |

[54] SWIVELING PRESSURE ROLLER ASSEMBLY
8 Claims, 11 Drawing Figs.

[52] U.S. Cl. .................................................. 226/187,
226/194
[51] Int. Cl. ................................................. B65h 17/22
[50] Field of Search .......................................... 226/176,
177, 180, 181, 186, 187, 194

[56] References Cited
UNITED STATES PATENTS

| 3,372,848 | 3/1968 | Macdonald .................. | 226/176X |
| --- | --- | --- | --- |
| 3,438,558 | 4/1969 | Hammond .................... | 226/194X |

*Primary Examiner*—Richard A. Schacher
*Attorney*—Paul W. Fish

ABSTRACT: A pressure roller assembly, such as incorporated in a business machine, which permits the parts to be snap-fitted together and to rotate or swivel with respect to one another. The assembly includes a pressure roller which snap-fits onto one end of a yoke and the yoke in turn snap-fits into a pressure rocker arm. The rocker arm is shaped to snap-fit onto a support rod so that the assembly can pivot about the rod as an axis to open and closed position with respect to a rotatable platen. The snap-fitted pivotal connections between the parts are accomplished by forming the parts of molded hardened plastic material having the inherent properties of lubricity and slight elasticity.

INVENTORS.
EDWARD A. NICOL.
EDWARD M. JOHNSON.
ATTORNEY.

SWIVELING PRESSURE ROLLER ASSEMBLY

BACKGROUND OF THE INVENTION

Pressure rollers have been widely used in the past for exerting pressure on magnetic tapes, paper webs or other record media fed through business machines for pressing the same against drive rollers in order to prevent misalignment of the same while guiding the same have been widely utilized in the prior art. Pressure rollers having adjustable mounting means which permits the rollers to follow an uneven surface of the drive roller or irregularities in the driven material have also been suggested. The type of pressure roller movement found in the prior art is usually either bodily translational, in which the pressure roller assembly is directly brought to bear against the platen, or pivotal, in which the assembly is swung to a position which bears against the material on the platen, the roller axis in both instances being maintained in parallel relation to the axis of the platen.

SUMMARY OF THE INVENTION

This invention is directed to an improved pressure roller assembly, such as associated with rotatable platens on business machines, composed of relatively rigid yet slightly resilient material and to the utilization of this property for securing the parts together by "snap-on" connections while enabling the parts to rotate or swivel with respect to one another and the whole assembly to be pivotally mounted in the machine. In such an assembly, the pressure roller is snap-fitted to a yoke-shaped carrier which in turn is snap-fittingly connected to a rocker arm by a resiliently contractual tenon which provides a desired swivel action about an axis perpendicular to that of the pressure roller. The rocker arm in turn is snap-fitted onto a support rod in the machine and pivotally mounted in this manner for swinging movement toward the platen so as to bring the roller into contact with record media fed thereby. The swiveling feature enables the roller assembly to compensate for any variations and irregularities in the platen or the material fed thereby, with the resulting reduced wear of the pressure roller and improved accuracy in paper tracking. The preferred plastic material for the parts of the device has in addition to its elasticity an inherent lubricity for self-lubricating the bearing surfaces of the snap-on connections.

An important object of this invention is to provide improved paper aligning means, such as utilized in business machines, which is composed of parts almost entirely of relatively rigid yet slightly resilient material and utilizing this property for joining these parts together yet providing relative rotative movement therebetween.

Another important object of the present invention is to provide an improved pressure roller assembly which allows the pressure roller to swivel in a direction normal to the pressure roller axis.

It is a further important object of this invention to provide improved means for aligning, guiding and controlling a tape or paper web, such as utilized in a business machine, which allows the yoke mounting the pressure roller ro swivel in a direction normal to the rotation axis of the roller, the swivel motion being provided by a novel resiliently yieldable, splined tenon at one end of the yoke.

The above-listed objects and other aspects of the invention will be further explained in the following description. For a more complete understanding of the invention, reference may be had to the following detailed description in conjunction with the drawings.

DESCRIPTION OF THE PREFERRED EMBODIMENT

Figure 1:
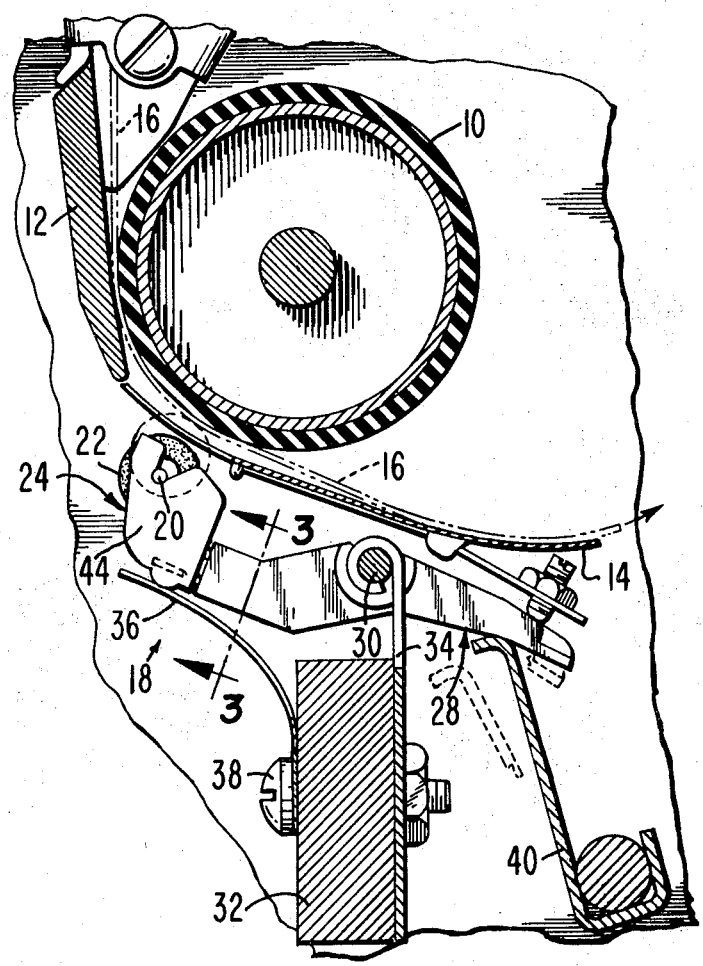
FIG. 1 is a side elevation of the platen portion of a business machine showing the pressure roller assembly in open position relation to the platen.

Referring now to FIG. 1, there is shown a web or tape-guiding and aligning system such as that incorporated in a business machine. The web, which may be paper, is usually required to be driven at relatively high speeds. The means employed may include a rotating platen driven by a motor over which the paper web or tape passes, and a pressure roller which, when actuated, bears against the web and platen, thereby causing the platen to drive the web. The present invention is concerned with a pressure roller assembly for accurately guiding, controlling and aligning the web as it passes over a portion of the periphery of the platen despite any irregularities in the platen or web.

Figure 2:
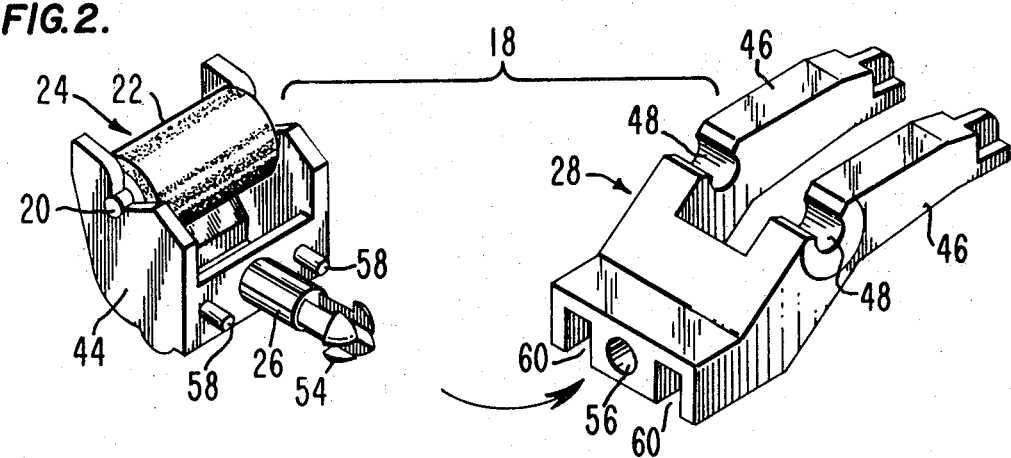
FIG. 2 illustrates in separate perspective views how the two major components of the assembly are swivelingly connected together.

Referring now to FIG. 1, in more detail and also to FIG. 2, there is shown a rotatable platen 10 and associated form guide members indicated at 12 and 14 which in this instance first guide the paper web or the tape 16 vertically down one side of the platen and then around a peripheral portion of the platen for exit in a general horizontal direction. Adjacent to the platen 10, and shown in full line in its open position, is a pressure roller assembly generally indicated at 18 constructed in accordance with the present invention. The pressure roller assembly comprises a pressure roller axle 20; a cylindrically-shaped pressure roller 22 preferably molded on the axle 20 and formed of material having a relatively high coefficient of friction, such as plastic, rubber or the like; a yoke-shaped frame member 24; a swivel yoke tenon 26 which forms an extension and preferably an integral part of the yoke 24; and an elongated rocking arm 28 which as will be described in more detail hereinafter is pivotally mounted intermediate its ends to a part of the machine. All the parts of the assembly 18 are preferably formed of material which has a slight degree of inherent resiliency for purposes brought out more fully hereinafter.

A support rod or shaft 30 of the machine extends parallel to the longitudinal axis of the platen 10 and usually for the length thereof, and this shaft is employed to pivotally carry one or more pressure rollers assemblies of the present invention thereon. This enables each pressure roller assembly to be rocked toward the platen 10 into engagement with the paper web 16 to the position shown in dotted outline in FIG. 1 when the form guiding members of the machine are in the operating mode. Through the drawing only shows one such pressure roller assembly mounted upon rod 30, it is understood that a plurality of such roller assemblies may be rockably suspended from the rod along the longitudinal extent thereof. The rod 30 is mounted in spaced relation to a supporting block 32 through the intermediary of a plate 34 having curled fingers which tightly grip the rod in the intervals between the pressure roller assemblies. A bias leaf spring 36 is shown fastened to one side of support 32 by means of a screw 38 which also may serve to secure plate 34 to the other side thereof. The spring 36 is tensioned against a surface portion of the yoke member 24 and yieldingly urges the assembly to swing about rod 30 toward the platen and abut the record media 16 or the platen in the absence of such media. To permit such swinging movement of each roller assembly, the guide member 16 is notched opposite each roller 22 so as to allow the roller to move through the plane of the guide as evidenced by the dotted position of the roller in FIG. 1. In the machine environment in which the invention is illustrated, each pressure roller assembly 18 is restrained from being rocked by the leaf spring toward the platen by a bail member 40 which abuts the rocker arm portion of each assembly. Pivotal movement of the bail member to the dotted position in FIG. 1 will release the pressure assemblies and allow them to be collectively swung toward the platen by the leaf spring.

The pressure roller assembly of this invention and certain of its main operating characteristics have now been generally described. In order to meet the objects of this invention and to provide the desired economy of manufacture, the self-movement of the parts in operation, and the "snap-on" swiveling connections, the parts making up the composite assembly are in accordance with this invention composed of material which is relatively rigid yet slightly resilient, and the parts are shaped in such a manner as to provide not only the "snap-on" form of joint connection but also to provide a pivotal action of the parts with respect to one another and to the supporting rod 30.

As earlier mentioned herein, a preferred material for the parts is a material which has a limited degree of resiliency thereby permitting the local areas of the parts of the assembly to yield to external forces and then following cessation of the force enabling these areas to restore themselves to their original positions. Certain plastic materials provide this characteristic and one such is Delrin, an acetel resin sold by E.I. du Pont de Nemours and Company, Inc. This type of plastic material, in addition to its slight inherent resiliency, has good lubricity thus obviating the need for a lubricant, such as grease or oil, which would likely stain the paper or tape media fed through the machine. Moreover, such material exhibits excellent resistance to permanent deformation or "cold flow."

Figure 4A:
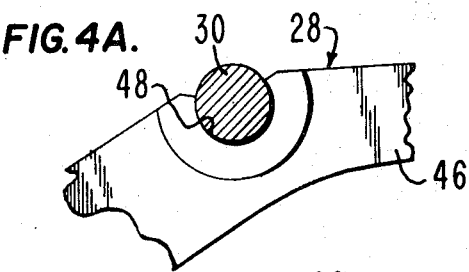
FIGS. 4A, B, and C are detailed views exemplary of the successive steps of snap-fitting the parts together with particular reference to snap-fitting the rocker arm to the machine support rod.
Figure 4B:
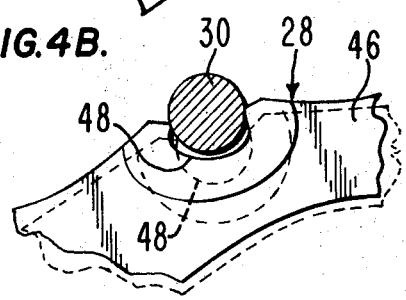
Figure 4C:
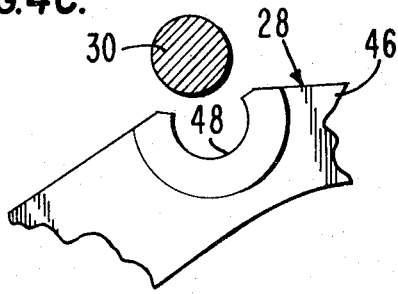

The properties of such plastic material are utilized in coupling the pressure roller 22 to the trunnion or yoke 24 and in the suspension of each whole roller assembly from the rod 30. These properties are also availed of in the swiveling connection between the yoke 24 and the rocker arm 28 as will be described more fully hereinafter. Referring to the perspective views of FIG. 2, and to the detail views of FIGS. 4A, B, and C, corresponding edge portions of the side walls 44–44 of the yoke member 24 and corresponding intermediate portions of the two sections 46–46 of rocker arm 28 are circularly recessed or grooved to provide a snap-fit of parts together and yet permitting rotative movement of one part relative to the other. Referring to the detail views of FIG. 4 which illustrate successive steps of assembling the rocker arms 28 onto the support rod 30, the circularly shaped aligned grooves 48–48 of the two sections of the rocker arms are so dimensioned that the entrance thereto is normally slightly less than the diameter of the rod, as evidenced by comparison of FIGS. 4B and C. The aligned grooves 48–48 are formed so as to be slightly more than 180° of a full circle, as shown in FIG. 4A. When the rod 30 is forced into the grooves, the plastic material at the entrance to the grooves yields to the rigid material of the entering rod and expands their openings to admit the rod, as shown by the movement of the plastic material from the dotted to solid line position in FIG. 4B. After the rod is fully received in the grooves 48–48, the resiliency of the plastic material causes the entrance of the grooves to return to their normal dimension thus releasably locking the rocker arm onto the rod yet permitting the arm to freely pivot thereabout, thus enabling the whole roller assembly to be swung toward and away from the platen 10 during the operation of the machine.

Figure 6:
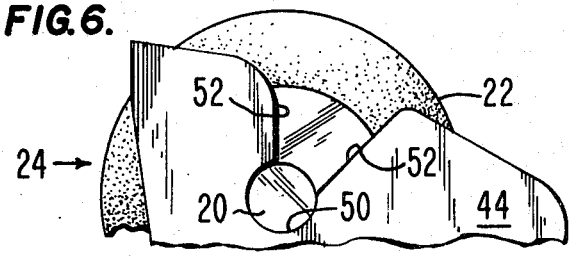
FIG. 6 is an enlarged detail view similar to FIG. 4A, showing the pressure roller in journaled assembly in the yoke member.

The illustrative details of FIGS. 4A, B, and C are equally applicable to the "snap-fit" of the axle or trunnions 20 of the pressure roller to the sidewalls 44–44 of the yoke-shaped frame member 24. The aligned grooves 50–50 receiving the trunnions are each located at the bottom of a V-shaped opening 52 as best shown in FIG. 6. The grooves are circularly formed slightly more than 180° of a full circle and are dimensionally shaped to receive the projecting extensions of the axle therein from accidental dislodgement but allowing complete freedom for the roller to rotate on its axis. The resilient material of which the yoke walls are composed will yield slightly to allow the roller trunnions to enter the grooves 50–50 and then return with a snaplike action to releasably lock the trunnions therewithin yet providing a journal mounting for the roller 22. The inherent slipperiness of the plastic material of which the yoke member is composed provides sufficient lubrication for the bearing surfaces in which the roller trunnions are journaled.

It was earlier mentioned herein that certain irregularities are sometimes encountered in the operation of such pressure roller devices. Uneven surfaces sometimes on the drive roller 10, or on the driven web material, will be encountered and if not compensated for will impair the function of such roller devices. To provide this desired compensation for any variations or irregularities in the platen, the pressure roller yoke 24 is connected to the rocker arm member 28 by means of a snap-on journal connection enabling the yoke to rotate about an axis substantially normal to the axis of rotation of the roller 22. This is accomplished by the provision of the swivel tenon 26 previously briefly mentioned which as shown preferably forms an integral extension of the yoke member 24.

Figure 5A:
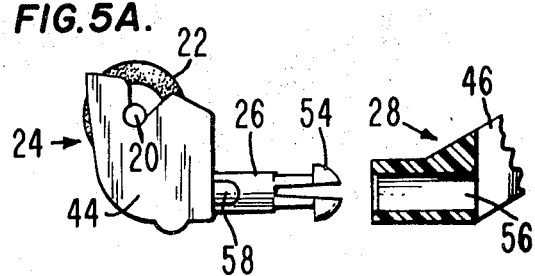
FIGS. 5A, B, and C are detailed views similarly showing successive steps in detachably connecting the yoke member to the rocking arm member.
Figure 5B:
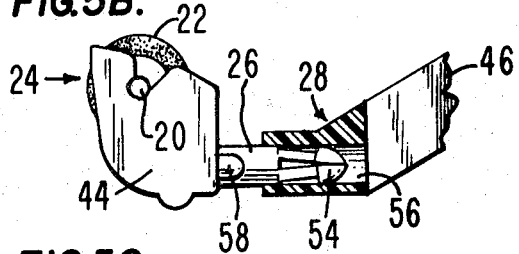
Figure 5C:
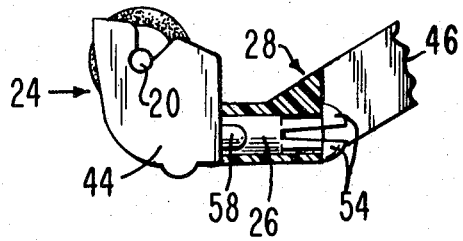

With particular reference to FIG. 2 it is noted that the tenon 26 has an enlarged spear-headed end 54 which is cross slotted to form a plurality of splines which will yield contractually when forced into a smaller circularly shaped hole 56 formed in the base of the rocker arm member 28. As illustrated in FIG. 2, the outer end of each spline of the tenon is chamfered to provide the wedging action which enables the separate splines to contract upon one another as they pass through the hole 56 which is of smaller diameter than the normal position of the splines. The separate detail views of FIGS. 5A, B and C show the successive positions assumed by the tenon and its splines as they are forced into the hole 56 of the rocker arm 28 and interlock therewith. Such a connection, although preventing unintentional separation of the parts, provides rotational movement of the yoke member relative to the rocker arm member so that it may be swiveled on an axis extending perpendicular to the axis of the roller 22. Moreover, the elasticity of the plastic material of which the tenon is formed causes its splines to resume their normal expanded condition after the headed end has passed completely through the hole 56 as shown in FIG. 5C.

Figure 3A:
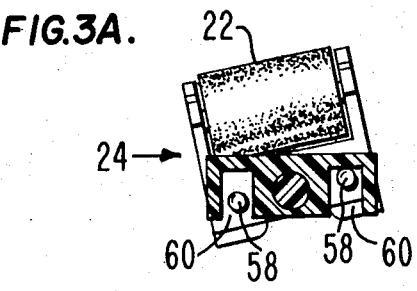
FIGS. 3A and B are cross-sectional views taken along the line 3–3 of FIG. 1 and illustrating rocking positions capable of being assumed by the pressure roller of the assembly.
Figure 3B:
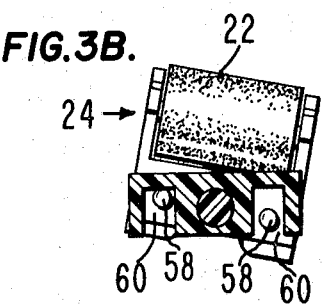

Only a slight degree of swiveling motion is necessary for compensating for the irregularities that may be encountered in the operation of this device and accordingly provision is made for limiting the swiveling motion to a relatively small arc. For this purpose, a pair of pinlike projections 58–58 are formed integrally on the yoke member in line with the tenon 26 but on opposite sides thereof. These projections are received in oversize openings or recesses 60–60 in the base of the rocker arm 28 on opposite sides of the hole 56. The oversize relationship of these recesses to the pins provides the desired limited swiveling motion of the yoke relative to the rocker arm. With reference to FIGS. 3A and B, it is noted that one or the other of the two pins 58 will abut the bottom of its respective recess 60 and prevent further swinging motion in that direction. The yoke member, however, is free to swivel between the extreme limiting positions illustrated in FIGS. 3A and 3B and thereby immediately compensate for any irregularity encountered in the feed of the record media 16.

I claim:

1. A pressure roller device for engaging rapidly moving media comprising in combination:

an elongated body having a side opening groove intermediate its ends forming a journal bearing for pivotally attaching the body to a support rod, the surface of the journal bearing extending for slightly more than 180° of a circle but leaving the balance thereof open to form an entranceway thereinto through which the support rod is snap-fittingly received in the bearing;

one end of said elongated body being in the form of a yoke and shaped to form a like pair of axially aligned journal bearings each having the bearing surface thereof extending slightly more than 180° of a circle but leaving the balance thereof open to form an entranceway thereinto; and a pressure roller mounted within the yoke and having axle extensions introduced through said entranceways and snap-fittingly received in said journal bearing for rotation therein.

2. The pressure roller device defined in claim 1 characterized in that the elongated body is wholly formed of a hardened plastic material having the properties of elasticity and lubricity.

3. A pressure roller device for pressing a rapidly moving record medium against a rotatable platen comprising, in combination:

an elongated body divided transversely into two parts pivotally connected together for swiveling movement relative to one another about an axis extending generally longitudinally of the body;

one part of the body having a yoked portion, the sides of which are shaped to form a like pair of journal bearings aligned on an axis extending crosswise to the swiveling axis and each having the bearing surface thereof extending slightly more than 180° of a circle and leaving the balance open to form an entranceway thereinto;

a roller mounted within the yoke portion of said one body part and having axle extensions of a size fitting the journal bearings and introduced through said entranceways for snap-fitting reception in the journal bearings; and the other part of the body having a groove extending crosswise to the direction of the swiveling axis and shaped to form a journal bearing extending for slightly more than 180° of a circle but leaving the balance thereof open as an entranceway through which a rod dimensioned to fit the bearing may be snap-fittingly received therein.

4. The pressure roller device defined in claim 3 characterized in that the elongated body is wholly formed of hardened plastic material having the inherent properties of elasticity and lubricity.

5. A pressure roller device for pressing rapidly moving record media against a rotatable platen comprising, in combination:

an elongated body wholly formed of hardened plastic material having the inherent properties of elasticity and lubricity and divided transversely into two parts;

a first part of the body being slotted longitudinally to provide two separated end sections each having an exposed groove aligned on an axis extending crosswise to the longitudinal dimension of the body, each of said grooves being similarly shaped to form a journal bearing extending for slightly more than 180° of a circle but leaving the balance thereof opened as an entranceway through which a rod dimensioned to fit the grooves may be snap-fittingly received therein and thus serve as a pivotal support for the device;

the second part of the body having a yoke portion, the sides of which are shaped to form a pair of grooves aligned on an axis extending crosswise to the longitudinal dimension of the body, each of said grooves being similarly shaped to form a journal bearing extending for slightly more than 180° of a circle but leaving the balance thereof opened as an entranceway thereinto;

a cylindrically-shaped roller positioned within the yoke portion of said second mentioned part of the body and having axle extensions of a size to fit the grooves of the yoke portion and introduced through the entranceways thereof and snap-fittingly received and journaled therein;

said first part of the body having an end opening hole therein extending to and opening into the longitudinal slot thereof; and a resiliently contractual tenon on said second part of the body having an enlarged head oversized said hole, said tenon projecting through the hole with the enlarged head disposed in the longitudinal slot so as to removably interlockingly secure the two parts together while providing swiveling movement of second roller carrier part with respect to the first part.

6. In a machine providing a pressure receiving surface past which record media are fed and a support rod spaced from the surface and extending generally parallel thereto:

a pressure roller device for pressing the second media against said surface as they are fed thereby;

said device comprising an elongated body composed wholly of hardened plastic material having the inherent properties of elasticity and lubricity;

said body having a groove therein snap-fittingly engaging the support rod and providing a journal mounting about which the body may pivot and thereby swing one end thereof toward and away from said surface;

said end of the body being in the form of a yoke, the sides of which are shaped to form a pair of axially aligned grooves; and a roller pressure member positioned within the yoke and having axle extensions snap-fittingly received in the aligned grooves, said grooves serving as journal bearings for mounting the roller member and enabling the device to apply a rolling pressure on the record media when the device is swung toward said surface.

7. In a machine providing a pressure receiving platen past which record media are fed and a support rod spaced from the platen and extending generally parallel thereto:

a pressure roller device for pressing the record media against said platen as they are fed thereby;

said device comprising an elongated body composed wholly of hardened plastic material having the inherent properties of elasticity and lubricity and divided transversely into two attachable parts;

one of said body parts having a groove therein snap-fittingly engagingly the support rod and providing a journal mounting about which the device may pivot toward and away from said surface;

the other of said body parts having a yoke-shaped portion, the sides of which are shaped to form a pair of axially aligned grooves.

a roller pressure member positioned within the yoke portion and having axle extensions snap-fittingly received in the aligned grooves and journaled therein for rotation; and means attaching the two body parts and providing swiveling motion of one part with respect to the other part about an axis extending generally perpendicular to that of the roller member and whereby the device is pivoted in the direction of the platen past which the record media is fed the roller member will apply a rolling pressure to the record media while at the same time being capable of swiveling to compensate for an encountered irregularity.

8. A pressure roller device for engaging rapidly moving media comprising, in combination:

a roller carrier member having a yoke portion shaped to form a like pair of axially aligned journal bearings each encompassing slightly more than 180° of a circle and leaving the balance of the circle open to form an entranceway thereinto, at least the yoke portion of the carrier member being formed of hardened plastic material having the property of a slight inherent elasticity and the further property of inherent lubricity;

a pressure roller mounted within the yoke portion of the role roller carrier member and having axle extensions introduced through said entranceways and snap-fittingly received in said journal bearings for rotation therein, the elastic property of the yoke portion allowing expansion of the entranceways as the axle extensions are introduced thereinto and the lubricous property of the yoke portion providing self-lubrication of the journal bearings enabling the axle extensions of the pressure roller to rotate freely therein;

a rocking member; and means coupling the roller carrier member ro the rocking member and providing swiveling movement of the roller carrier member and the pressure roller carried thereby about an axis extending substantially perpendicular to the axis of rotation of the pressure roller.

PO-1050
(5/69)

UNITED STATES PATENT OFFICE
CERTIFICATE OF CORRECTION

Patent No. 3,561,660  Dated February 9, 1971

Inventor(s) Edward A. Nicol and Edward M. Johnson

It is certified that error appears in the above-identified patent and that said Letters Patent are hereby corrected as shown below:

Col. 1, line 58 change "ro" to --to--.

Col. 2, line 27 after "or" and before "web" insert --the--.

Col. 2, line 58 change "Through" to --Though--.

Col. 3, lines 73-74 after "axle" and before "therein" insert --20 beyond the roller and releasably lock the axle--.

Col. 6, line 7 change "second" to --record--.

Col. 6, line 46 after "parts" and before "and" insert --together--

Col. 6, line 49 after "roller" and before "device" should read --member, whereby when the--.

Col. 6, line 53 change "an" to --any--.

Col. 6, line 66 delete "role".

Col. 7, line 1 change "ro" to --to--.

Signed and sealed this 22nd day of June 1971.

(SEAL)
Attest:

EDWARD M. FLETCHER, JR.
Attesting Officer

WILLIAM E. SCHUYLER, JR
Commissioner of Patents